United States Patent [19]
Beecroft et al.

[11] 3,956,769
[45] May 11, 1976

[54] RECORDING SYSTEM HAVING COINCIDING SERVO AND DATA TRACKS

[75] Inventors: Harold James Beecroft, Minneapolis, Minn.; Srinivasan Venkata Chari, Foster City, Calif.

[73] Assignee: Control Data Corporation, Minneapolis, Minn.

[22] Filed: Aug. 12, 1974

[21] Appl. No.: 496,509

[52] U.S. Cl. ................................. 360/77; 360/131
[51] Int. Cl.² .................... G11B 21/10; G11B 5/66
[58] Field of Search ........................ 360/75–78, 360/72, 131–136

[56] References Cited
UNITED STATES PATENTS

| | | | |
|---|---|---|---|
| 3,404,392 | 10/1968 | Sordello | 360/77 |
| 3,614,756 | 10/1971 | McIntosh | 360/77 |

OTHER PUBLICATIONS

"Recording Servo Information Below a Data Surface in a Homogeneous Medium", Schwarz, I.B.M. Tech. Disc. Bull., Vol. 17, No. 2, July 1974, p. 536.

*Primary Examiner*—Robert S. Tupper
*Attorney, Agent, or Firm*—Edward L. Schwarz

[57] ABSTRACT

Magnetic recording apparatus employing a medium characterized by having a relatively high coercivity recording layer having servo tracks recorded therein, and a second layer of lower coercivity in which data may be recorded. The servo tracks are read by a head and this signal is used to properly position the head for writing and reading of data. If the medium is a disc, e.g. the servo tracks may be either concentric circles or a single spiral concentric with the center of the disc.

4 Claims, 3 Drawing Figures

RECORDING SYSTEM HAVING COINCIDING SERVO AND DATA TRACKS

BACKGROUND OF THE INVENTION

1. Field of the Invention

This invention can be adapted for use in almost any kind of data storage system where data sequences are recorded in specified areas of the recording medium by relative motion between it and a magnetic transducer head. In the present state of technology the most common embodiment of this invention will probably be in a magnetic disc recording system where the recording medium is a rotating disc, and the magnetic head is mounted on an arm which moves the head radially to access various data tracks on the disc as desired. A variation has applications in strip recorders for positioning the strip relative to the head.

In high density disc recording apparatus for example, concentric recording tracks have radial densities from 200 to as many as 1,000 tracks per inch. It has been found to be almost impossible to record and read data having such track densities without having a fixed set of references on the disc, or on at least one of the discs in a multi-disc system, which can be used for positioning the head or arms. In one design having several discs carried on one spindle, one disc surface is devoted to carrying these reference marks, which in fact comprise a series of concentric servo tracks read in a fashion similar to data tracks, but used only for positioning the head arm assembly.

Several problems have arisen when such as arrangement is used in high track density systems. First of all, it is obvious that one recording surface is lost for data recording purposes because it is dedicated to servo tracks. Secondly, and more importantly, errors in alignment of the data head arms with respect to the servo head arm plus errors in the spindle and disc location and dimensions impose an upper limit on radial track density, which if exceeded results in data readback errors.

2. Description of the Prior Art

Several different patents disclose recording media formed from two distinct layers of differing coercivities. U.S. Pat. No. 3,219,353 (Prentky) discloses a recording medium usable in the system which we disclose, and discusses various considerations involved in its use. Prentky comprises the best art of which applicants are aware. U.S. Pat. No. 2,691,072 (Mathes) discloses a magnetic recording medium having two magnetic layers of differing coercivities. In addition, a large number of patents disclose systems employing a recording medium having at least one servo track which may be read and the signal used to position a read or write head adjacent the recording medium. See, e.g. U.S. Pat. No. 3,593,331 (Connell, et al.) and U.S. Pat. No. 3,656,130 (Bucklin, et al.)

BRIEF DESCRIPTION OF THE INVENTION

The recording medium comprises a substrate having a transcribing surface and carrying thereon an inner magnetic recording layer having upon at least a portion of it a second outer magnetic recording layer. One, usually the inner, recording layer is of relatively high coercivity, requiring a relatively strong magnetic field to alter its magnetic patterns. At least one servo track is recorded in this layer. The second (usually outer) recording layer is of lower coercivity, and is intended for recording of data. Because of the lower coercivity, data can be recorded in the second layer without erasing or otherwise affecting the servo track(s). In use, the recording medium may be substituted in any magnetic data recording system wherein reference marks on the medium are employed to properly position a data transducer. The transducer must be modified, or another added, to read the servo signals in addition to recording and reading data. The servo signal produced by the transducer can be used in exactly the same way that the aforementioned reference markings, however previously detected, were used to position the transducer. Each data track is then written in precise position relative to its associated servo track. Most conveniently, the data track is placed directly on the path over which the servo gap of the transducer moves, thereby avoiding problems caused by thermally-induced or manufacturing dimensional variations. In one preferred embodiment, the recording medium is a disc and the transducer is a special magnetic head. When the servo and data tracks are very close to each other, the servo and data signals will both be present in the signal read back from the head, necessitating extraction of the servo signal from the composite signal. We prefer to accomplish this extraction by selecting the servo signal frequency to be very much different from that of the data signal. By making the flux gap for the relatively high frequency signal relatively short and for the low frequency signal to be relatively long, the necessary separation can be achieved in the head itself, and electronic separation is not necessary. This allows a single servo track for every data track, permitting the head to be positioned much more accurately for each data track.

Accordingly, one object of this invention is to increase the track density in a magnetic recording system.

Another object is to eliminate the need for separate recording media carrying transducer position references or servo tracks.

A third object is to allow existing data recording systems to employ this new positioning apparatus with a minimum of conversion expenses.

Still another object is to avoid alignment problems between the various heads.

DESCRIPTION OF THE PREFERRED EMBODIMENTS

Figure 1:
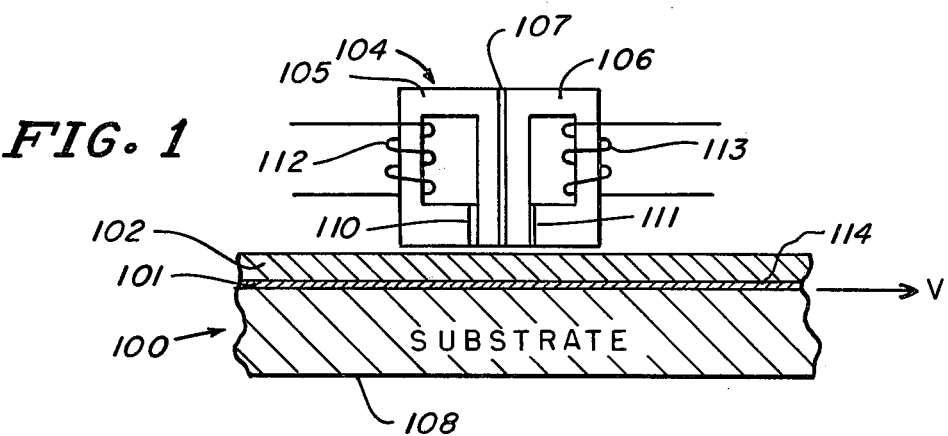
FIG. 1 is a cross-sectional view of the recording medium with a typical magnetic head adjacent it in position for transcribing signals between the two.

FIG. 1 discloses a representative medium 100 having substrate 108 which may, in the case of a disc, be of rigid metal such as aluminum. In the case of a flexible medium such as used in magnetic strip recorders, this substrate may be flexible plastic of the type widely used in such devices. Recording layer 101 is firmly affixed to a transcribing surface 114 of substrate 108. Transcribing surface 114 is typical of that used in conventional recording media for carrying the recording layer and need not be further considered. Recording layer 101 is made of any of the well known materials which have high coercivity, on the order of 400 to as high as 1,000 Oersteds. Electrolessly plated nickel cobalt is suitable for use with rigid substrates and may have a thickness of around 5 uin. Special iron oxide coatings having high coercivities may also be used in both rigid and flexible substrates. After high coercivity recording layer 101 has been formed on substrate 100, lower coercivity recording layer 102 is placed upon and firmly affixed to it. Lower coercivity recording layer 102 is preferably an iron oxide type commonly used in data recording, and may have a coercivity from 200 to 350 Oersteds. The coercivity of outer recording layer 102 is preferably not more than one-half that of inner recording layer 101. Thickness can be around 50 uin. or less, as is well known.

After both layers have been formed, servo tracks 200a and 200b (FIG. 2) are written in inner layer 101. These tracks may have any of the special formats developed for them, and may additionally include other information, such as track identifiers which specify the address of the individual tracks. The width of the tracks is dependent on the track density, of course, and its relationship thereto is well known in the art. Preferably, every second track 200a has a first distinctive pattern of signals and all those tracks 200b between them have a second distinctive pattern.

It is also necessary that there be some way of separating or distinguishing the servo track signals from the data signals when the data is read. The simplest way and the one preferred, is to make the servo track linear pulse density (pulses per linear track inch) significantly different from that of the data signals later to be placed in outer layer 102. The ratio between the servo track and the lowest data pulse densities for this embodiment can be as close as 4:5 resulting in data playback frequency being always at least 25% faster than the servo signal. These signals can be separated by state-of-the-art electronic means with high accuracy. As the pertinent electronic arts improve, it is possible that the ratio may be brought even closer to unity. It is preferred, however, that the pulse density ratio (servo to data bits) and hence frequency, have a ratio of around 1:10. As will be explained later this allows dispensing with electronic separation.

The servo tracks must be written with high accuracy, especially if high track densities (250 tracks per inch or higher) are sought. Several techniques are known which will allow these tracks to be formed with a deviation from nominal of only a few micro-inches, and can be employed in track writing for high track density systems. It should be understood that the actual means employed for creating the servo tracks is not considered a part of this invention, since the high track density achievable by the invention is simply a result of employing the invention.

Head 104 is of a design preferred for simultaneously reading the servo tracks in inner layer 101 and transcribing data in layer 102. Head 104 contains two separate magnetic flux paths. The flux path devoted to reading the servo tracks comprises core 105 with gap 110 therein. The length of servo gap 110 is, with the specified thicknesses of recording layers 101 and 102 (5uin. and 50 uin. respectively) preferably about 10 to 20 times the length of data gap 111, and about 1 mil for servo signal frequencies of 50 to 500 kHz. (By length is meant the distance between the two opposing core faces defining a gap.) Servo gap 110 is longer than data gap 111 partially because it must be capable of reading the servo tracks which are located slightly further from it during operation than is usually the case, but more importantly to ensure that the flux created in core 105 is predominately the result of the relatively low frequency servo track signal. Servo winding 112 is wound around core 105. Both cores 105 and 106 may be made from any convenient ferrite material. Core 106 and data gap 111 comprise a second magnetic circuit path separated from and attached to core 105 by separator 107 in a preselected position relative to core 105 and gap 110. Gap 111 is significantly shorter than gap 110, with the length normally associated with gaps for reading and writing data, e.g. on the order of 50 to 100 uin, and hence predominately responsive to the high frequency data pulses. A data winding 113 on core 106 is used both for recording data in layer 102 when receiving an input signal and for reading data back, and is wholly conventional.

Figure 2:
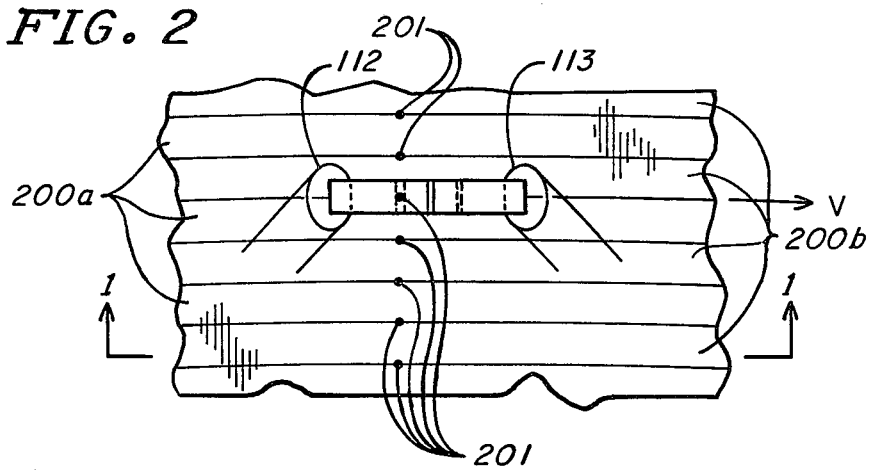
FIG. 2 discloses a top view of the head in operating position adjacent the recording medium.

In operation, head 104 is positioned in an appropriate orientation adjacent recording medium 100 as shown in FIG. 1, to allow transcribing data and reading servo signals. Recording medium 100 is caused to move relative to head 104 and transcribing points 201 (FIG. 2) with a preselected velocity V as shown by the adjacent arrow. This relative movement induces a signal in servo coil 112. The width of servo gap 111 is such that its position relative an individual track 200 can be detected by analysis of the servo signal induced in winding 112. It is preferred that the servo gap 111 be in the chosen alignment when between a pair of servo tracks 200a and 200b, as shown in FIG. 2, the tracks having the previously mentioned alternating distinct signal patterns. Any significant deviation of gap 111 from directly between a selected pair of tracks 200a and 200b will cause a detectable difference in the relative level of each signal component induced individually by tracks 200a and 200b. Upon detection of this difference, head 104 is simply shifted by means not shown, transverse to tracks 200 a and 200b until balance is present between the signal components from them. Transcribing points 201 represent alternate positions which gap 110 may occupy in accessing different data tracks.

The signal induced in servo winding 112 will include only a negligible component of the data recorded in data layer 102 if gap 110 is made sufficiently long, thereby attenuating the relatively high frequency data signals. It is preferred for this reason that the servo signal have no more than 1/10th the frequency that the data signal does. Thus, for the usual range of data signal frequency of 0.5 to 5.0 Mhz., the servo signal frequency will range from 50 to 500 Khz. This avoids the necessity for electronic separation. If electronic means are used for separating the servo and data signals, current electronics technology permit a frequency ratio between the servo and the data signals of approximately 4:5. This would place the servo frequency in the 0.4 to 4 Mhz range for the data frequencies mentioned. With this change in frequencies, the servo gap length must be shortened somewhat as well.

Figure 3:
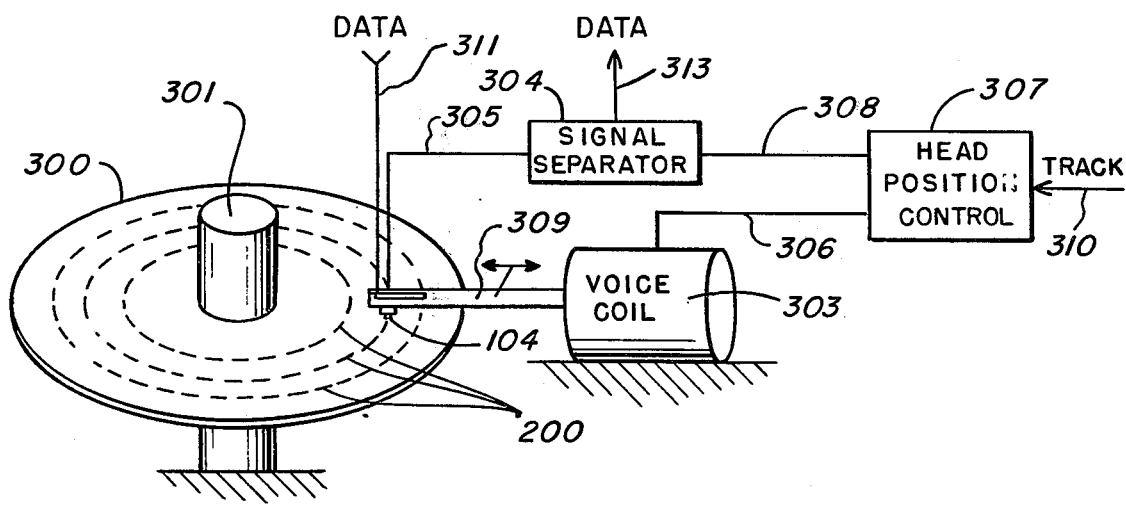
FIG. 3 displays the essential elements of a recording system employing a disc recording medium having the characteristics shown generally in FIGS. 1 and 2.

Turning next to FIG. 3, a simple block diagram of a recording system using the recording medium of this invention is shown. Disc 300 carries the magnetic recording layers and the data tracks on at least its upper surface. Disc 300 is mounted on and rotated by spindle 301. Head 104, mounted on the end of movable arm 309, receives from an external source at intervals an input signal on line 311 encoding data to be recorded.

Arm 309 is shifted radially with respect to disc 300 by voice coil 303 responsive to a drive signal supplied on line 306. Line 305 supplies both servo and data signals to a signal spearator 304. The servo signal is extracted and supplied to head position control 307 on line 308, while the data signal is supplied on line 312 to an external user. Head position control 307 receives a track signal on line 310 from an external source such as a computer. The track signal specifies through any convenient addressing scheme which of the concentric data tracks on disc 300 is to be employed for data transcription. Head position control 307 transmits a signal to voice coil 303 on line 306 which causes voice coil 303 to position the head at a position specified by the signal on line 306. This position allows data to be transcribed by head 104 in the selected track.

The servo signal on line 308 serves two purposes. First of all, as implied, if provides for positioning head 104 precisely with respect to the specified one of the servo tracks 200 on disc 300. Head position control 307 also makes use of the signals to determine to which one of the many tracks on disc 300 head 104 is adjacent, and upon receiving a new track signal on line 310, causes the voice coil to shift head 104 in the appropriate direction an appropriate number of tracks to allow access to a new data track. Such means for positioning a head with respect to a desired track is old in the art and no further discussion of it is deemed necessary.

This invention may similarly be applied to strip recorders such as is disclosed in U.S. Pat. No. 3,773,983, Lateral Strip Control Apparatus (Larson). Instead of edge sensing and the attendant problems, the heads employed can sense servo tracks recorded in the strips, and position the heads with respect to the strip as was done with the disc memory described in FIG. 3.

Certain variations on the recording medium described in connection with FIGS. 1 and 2 are possible. In applications such as audio recording, which is relatively low frequency, reliable positioning of head 104 by reading of servo signals of even lower frequency would result in unacceptable errors in positioning head 104. In such a case, the servo signals may be recorded at a frequency much higher than that of the data signals. In such a case, signal separation can occur exactly as before, but the servo signal comprises the higher frequency component in servo winding 112, and separation must proceed on this basis. In practice, this means usually that servo gap 110 must be chosen shorter than data gap 111, in accordance with the previously mentioned generally known principals. In such a situation a spiral track, as in phonograph recordings has advantages.

It is also possible, whether the frequency ratio selected is greater or less than 1, to reverse the roles of the inner and outer recording layers 101 and 102. That is, outer layer 102 may be made the higher coercivity layer and inner layer 101 the lower coercivity one. In this embodiment, it is preferable that outer layer 102 be made significantly thinner than inner layer 101, so as to allow data to be written effectively on layer 101 without the use of a writing field so strong that it destroys the servo tracks in outer layer 102. Apart from this restriction, such a combination recording medium may be used in the same fashion that one having the inner layer of higher coercivity might be used.

Having thus described our invention, what we claim as our invention is:

1. A magnetic recording system comprising
   a. a magnetic recording medium comprised of a substrate having a transcribing surface, an inner magnetic recording layer affixed to the transcribing surface, and an outer magnetic recording layer affixed to the inner, the coercivities of the two layers being sufficiently different to permit alteration of the magnetic pattern in the lower coercivity layer without affecting the pattern in the other, and the higher coercivity layer having at least one servo track recorded therein;
   b. means for supporting the medium and for causing the entire length of the servo track to move relative to a fixed transcribing point;
   c. a transducing head having a servo signal flux path containing a servo gap intersecting a recording face, and a servo winding producing a servo signal varying with distance of the servo gap from the servo track when the recording face is placed in a transcribing orientation adjacent the outer layer, and a data signal flux path having a data gap substantially shorter than the servo gap intersecting the recording face at a preselected position relative to the servo gap, and a data winding;
   d. a head support supporting the head in the transcribing orientation suitably near the servo track to cause the servo signal to be induced within the servo winding while the track moving means is operating;
   e. gap shifting means for shifting the gap position transversely and relative to the servo track responsive to a gap shifting signal;
   f. control means receiving and examining the servo signal from the head, for supplying the gap shifting signal to the gap shifting means causing the servo gap to be shifted relative the servo track to cause the servo signal to more closely attain a preselected state;
   g. recording means receiving an input signal containing data for recording, for supplying a recording signal to the head causing the data in the input signal to be recorded in the lower coercivity layer of the medium with a pulse density at least 10 times higher than the servo signal without affecting the recorded servo tracks in the higher coercivity layer; and
   h. playback means for producing when the data gap is within a preselected distance of the data track, a data playback signal within the data winding encoding data recorded in the data track.

2. The apparatus of claim 1, wherein the gap length ratio is at least 10:1.

3. A magnetic recording system comprising
   a. a magnetic recording medium comprised of a substrate having a transcribing surface, an inner magnetic recording layer affixed to the transcribing surface, and an outer magnetic recording layer affixed to the inner, the coercivities of the two layers being sufficiently different to permit alteration of the magnetic pattern in the lower coercivity layer without affecting the pattern in the other, and the higher coercivity layer having at least one servo track recorded therein;
   b. means for supporting the medium and for causing the entire length of the servo track to move relative to a fixed transcribing point;
   c. a transducing head having a servo signal flux path containing a servo gap intersecting a recording face, and a servo winding producing a servo signal varying with distance of the servo gap from the servo track when the recording face is placed in a transcribing orientation adjacent the outer layer, and a data signal flux path having a data gap substantally longer than the servo gap intersecting the recording face at a preselected position relative to the servo gap, and a data winding;

d. a head support supporting the head in the transcribing orientation suitably near the servo track to cause the servo signal to be induced within the servo winding while the track moving means is operating;

e. gap shifting means for shifting the gap position transversely and relative to the servo track responsive to a gap shifting signal;

f. control means receiving and examining the servo signal from the head, for supplying the gap shifting signal to the gap shifting means causing the servo gap to be shifted relative the servo track to cause the servo signal to more closely attain a preselected state;

g. recording means receiving an input signal containing data for recording, for supplying a recording signal to the head causing the data in the input signal to be recorded in the lower coercivity layer of the medium with a pulse density at least 10 times lower than the servo signal without affecting the recorded servo tracks in the higher coercivity layer; and h. playback means for producing when the data gap is withing a preselected distance of the data track, a data playback signal within the data winding encoding data recorded in the data track.

4. The apparatus of claim 3, wherein the gap length ratio is at least 10:1.

* * * * *